United States Patent [19]

Downey

[11] Patent Number: 4,816,315
[45] Date of Patent: Mar. 28, 1989

[54] SHAPED SKIN FOR DECORATIVE PARTS

[75] Inventor: Raymond E. Downey, Copley, Ohio

[73] Assignee: The Goodyear Tire & Rubber Company, Akron, Ohio

[21] Appl. No.: 11,463

[22] Filed: Feb. 5, 1987

[51] Int. Cl.$^4$ .............................................. B32B 27/16
[52] U.S. Cl. ................................... 428/151; 430/284; 522/95
[58] Field of Search ................ 428/10, 151; 522/95; 430/284; 427/44; 156/61

[56] References Cited

U.S. PATENT DOCUMENTS

| | | | |
|---|---|---|---|
| 3,560,237 | 2/1971 | Miller | 427/44 |
| 4,057,431 | 11/1977 | Finelli et al. | 430/284 |
| 4,131,571 | 12/1978 | Crawley et al. | 428/325 X |
| 4,135,007 | 1/1979 | Lorenz et al. | 427/44 |
| 4,205,018 | 5/1980 | Nagasawa et al. | 427/44 X |
| 4,269,680 | 5/1981 | Rowe | 522/95 |
| 4,380,604 | 4/1983 | Neuhaus et al. | 428/473 X |
| 4,420,541 | 12/1983 | Shay | 427/44 X |
| 4,458,007 | 7/1984 | Geissler et al. | 522/95 X |
| 4,483,759 | 11/1984 | Szycher et al. | 528/75 X |
| 4,606,994 | 8/1986 | Illers et al. | 430/330 X |

*Primary Examiner*—Henry F. Epstein
*Attorney, Agent, or Firm*—J. D. Wolfe; Marc R. Dion, Sr.

[57] ABSTRACT

A method of molding high definition skins of a photocurable polymers, to said skins and said skin filled with a foam to yield a cushion protective or decorative item.

9 Claims, No Drawings

SHAPED SKIN FOR DECORATIVE PARTS

TECHNICAL FIELD

This invention relates to a method of molding skins and related decorative cushioning goods, to said skins and the composition used to mold said goods. More particularly, this invention relates to a method for shaping skins with relatively high definition or grains or designs therein. Specifically, this invention relates to a composition for use in this invention.

BACKGROUND OF THE INVENTION

Cushioning materials such as seat cushions, crash pads and other decorative interior automotive parts as well as chairs are made by vacuum forming a vinyl or ABS sheet material over a form (buck form) to form a shaped skin having the contour and shape of the desired part. This skin is plced in a mold and filled with foam to yield the finished skin covered foam article. This method of manufacture does not effect high definition in the surface of the skin viz a sewed effect but quite the contrary will tend to destroy any raise or surface definitions in the vinyl or ABS sheet.

Therefore, high definition skin items have to be formed by slush molding or rotary casting type molding which requires the mold to be heated and cooled as well as to be rotated or rocked with, in many cases, loading an excess change to the mold and then dumping the excess charge polymer. Not only is such a molding process expensive in energy consumed in rocking, heating and cooling the mold but it causes premature mold failure due to cracking the metal molds. This premature mold failure contributes a significant amount to the cost of forming each skin. Further, these methods use very expensive electro-plated molds.

DISCLOSURE AND PRACTICE OF THE INVENTION

This invention provides a method of forming skins that may have high definition design thereon without subjecting the mold to repeated cycles of high heating and cooling. This invention permits a fluid or fluidizable molding composition to be set to a solid by the effects of actinic radiation passing through the mold to polymerize said composition within said mold to yield said molded article.

A mold of polyethylene, fluorocarbon and related plastics that pass actinic radiation such as ultraviolet light, electrons, x-rays, gamma rays, beta rays and related rays is formed by pouring said plastic into a master mold having the shape and definition design desired such as for example, to simulate a rough leather or wood or a sewn or stitched effect to form the desired male mold part and the desired female part. The polyethylene male and female parts of the plastic resolidify and are stripped from the master mold to give a polyethylene mold for use in this invention. The cavity of the female mold part is charged with a suitable photocurable molding composition, preferably the liquid state or one readily fluidized at the mold temperature. Then the male mold part is moved to closed position within the female mold part to cause the fluid molding composition to fill the cavity formed between said mold parts. The fluidized molding composition is subjected to sufficient actinic radiation to effect a cure of the fluidized molding composition by forming a solid molded article. With some molding compositions it is desirable to subject the actinic radiation solidified composition to a post heat cure either in the mold or after it is stripped from the mold to develop optimum physical properties.

Any of the liquifiable or fluidizable actinic radiation curable compositions may be used in this invention. Specific classes of these are the ethylenically unsaturated polyurethanes, polyesters, and polyethers or the unsaturated polyolefins. Sometimes to facilitate the liquification or fluidization of the actinic radiation curable compositions, it is desirable to compound the composition with plasticizers or diluents with those that are photopolymerizable being desired.

A very desirable photogellable liquid or fluid composition is formed by blending 100 parts of a polyvinyl chloride, preferably of the plastisol type with sufficient plasticizer, usually about 10 to 100 parts and about 10 to 60 parts of a photopolymerizable polymer with stabilizing amounts of polyvinyl chloride stabilizer and other additives.

Another desirable photogellable composition is a blend of an ethylenically unsaturated polyurethane of about 69 to 40, preferably 55 to 40 percent by weight of ethylenically unsaturated polyurethane and 35 to 60 and preferably 40 to 60 percent by weight of polyvinyl acetate and if needed sufficient plasticizer or diluent to give the blend a liquification temperature of less than about 220° C., and preferably less than 150° C..

The ethylenically unsaturated polyurethanes are generally solids or liquids.

Solid ethylenically unsaturated polyurethanes are well known and available under various trademarks, for instance, Uvithane TM 788 and 782, and have viscosities at 71° C. of about 200 to 1000 poises and preferably of about 300 to 750.

These ethylenically unsaturated polyurethanes generally have melting points less than about 70°–80° C. and preferably less than 80° C. and preferably exhibit relatively sharp melting points or relatively low viscosities to permit the resulting blended composition to readily flow in the mold cavity to give a sharp definition to the article.

The useful unsaturated polyurethanes are the reaction product of an organic polyisocyanate such as the well known toluene diisocyanates, methane di(phenylisocyanate), also called MDI, isophorone diisocyanate and hydrogenated MDI, or naphthalene diisocyanate, with a polyol of 2 to 6 or more hydroxyls and having a molecular weight up to 3000, 4000 or 7000. These polyols can be polyether polyols, polyester polyols and hydrocarbon polyols. The ethylenic unsaturation is usually introduced by reacting a monomer containing ethylenic unsaturation in the reaction with organic polyisocyanate. Alternately these monomers as represented by the well known hydroxyl alkyl acrylates or methacrylates or the unsaturated glycols and acids which can react to yield polyesters for use to form a polyurethane having an unsaturation equivalent of about 0.1 per 100 grams and higher. Generally the range of unsaturation can vary from about 0.1 to 0.40 or higher equivalents per 100 grams of polyurethane with the preferred range being 0.15 to 0.25 equivalents.

Also unsaturated plasticizers or monomers can be used to advantage, for example the acrylates or methacrylates of the polyols such as ethylene glycol, propylene glycol or butanediol to control the viscosity and to render the higher melting urethanes more readily usable.

Plasticizers can be used to advantage in the composition of this invention to adjust the melting point and/or viscosity of the meltable compositions. Generally the solid plasticizers that melt below about 150° C. or no higher than 250° C. are preferred although the well known fluid or liquid plasticizers useful with vinyl resin can be used. It is preferred in one embodiment that the plasticizers be compatible with polyvinyl acetate and the thermoplastic urethane used to prevent excess exudation or bleeding of the plasticizer. The plasticizer can be used in amounts of about 5 to 100 parts per 100 parts with generally about 5 to 50 parts being preferred.

The usual fillers and stabilizers can be used to advantage too. Examples of suitable known photopolymerization initiators include benzoins such as benzoin, β-methylbenzoin, benzoin methyl ether, benzoin ethyl ether, β-phenylbenzoin, β-phenylbenzoin, β-allylbenzoin, phenones such as acetophenone, benzophenone, anthraquinones such as anthraquinone, chloranthraquinone, methylanthraquinone, ter-butaylanthraquinone, disulphides such as diphenyl disulphide, tetraethylthiuram disulphide, diketones such as benzyl, diacetyl, uranyl salts such as uranvl nitrate, uranyl propionate; 2-naphthalene sulfonyl chloride; metal halides such as silver chloride, silver bromide, stannic chloride, stannous chloride and titanium chloride.

These photopolymerization initiators are used in an amount of from 0.001 to 10 percent by weight based upon the total weight of the photopolymerizable composition. When the amount of the photopolymerization initiator is less than 0.001 percent by weight the photopolymerization is greatly retarded and is frequently too slow for practical commercial purposes. On the other hand, amounts of initiator of more than 10 percent by weight do not significantly increase the reaction and would be uneconomical. Usually 0.5 to 3 percent is used.

Although the composition described above is readily utilizable in this invention, another type can be made in a Hobart type mixer wherein a photopolymer made by reacting a 1000 part of a polytetramethylene ether glycol of about 1000 molecular weight and 115.8 parts of toluene diisocyanate to form a prepolymer. Then this prepolymer was terminated with hydroxy ethyl methacrate to yield the photopolymer.

A commercial thermoplastic urethane, B F Goodrich Company's Estane TM, may be blended with the esters of ethylene glycol dimethacrylate to give a urethane containing ethylenic unsaturation and this may be blended with polyvinyl acetate to give a photocurable coating.

The nature of this invention can be seen more readily and more fully appreciated by reference to the following representative examples where all the parts and percentages are by weight unless otherwise indicated.

EXAMPLES

A number of blends were made using the recipes shown in Table I by mixing the ingredients on a heated mill and then pouring the melt in molds to obtain test skins which were cured for 7 minutes by exposure to ultraviolet light on the under side and 10 minutes on the top side of the molds. The physical properties of the cured test skins are given in Table I.

TABLE I

| Composition No | 1 | 2 | 3 | 4 |
| --- | --- | --- | --- | --- |
| Thermoplastic urethane | 40 | 40 | 40 | 40 |
| Polyvinyl acetate | 50 | 55 | 50 | 30 |
| Plasticizer | 10 | 5 | | 20 |
| Hi Sil | | | 5 | |
| Photoinitiator | 0.5 | 0.5 | 0.5 | 0.5 |
| Tensile, MN/M$^2$ | 2.55 | 2.7 | 6.9 | 4.4 |
| Elongation, % | 370 | 391 | 1000 | 638 |
| Shore A | 51–54 | 52 | 55 | 44 |

The thermoplastic urethane was Uvithane TM 788. Plasticizer No 1 was pentaerythritol tetrabenzoate and the photoinitiator was 2,2-dimethoxy-2-phenyl acetophenone. Then the skin was placed in an air heated oven upside down and at 150° C. to leave a skin having sewn patterns and exhibiting optimum physicals.

An arm rest of an elongated C shape was prepared by making a master mold having a sewn stitch pattern along inside upper position of the C simulating the apperance where a fabric has been sewn over the C handle. A polyethylene mold was made in the master mold by fillng with molten polyethylene and letting it resolidify. A lid for the polyethylene mold was formed by filling the lid portion of the master mold with a molten polyethylene and allowing it to resolidify before stripping from the master mold.

The cavity of the polyethylene mold was charged with a charge of a liquid ethylenic unsaturated polyurethane composition. Then the polyethylene lid portion was closed to force the charge to fill the cavity between the male part and female part to leave a clearance of essentially 10 mil to give a skin of that thickness. The mold was exposed to x-rays or electron beams to effect cure of the charge to point where it was a solid. The lid was opened and a standard Mobay polyetherurethane foam recipe was added to the skin and a metal part for attaching the arm rest was placed over the polyurethane to serve as a mold cover for the polyethylene mold part during the foaming stage. The foamed and set polyurethanes in the skin was stripped from the polyethylene part to give the decorative arm rest having simulated sewn seams and the metal attaching means embedded in the foam.

The ethylenically unsaturated polyurethane can be those made by U.S. Pat. No 4,057,431 or other well known methods blended with a plasticizer such as 10 to 80 parts of dioctyl adipate, 0 to 60 parts filler such as Hisil EP, and a photoinitiator such as 2,2-dimethoxy-2-phenyl acetophenone.

Preferably the above contains 20-60 per 100 parts of urethane of hydroxethylmethacrylate, trimethyl-propane-trimethacrylate for best results.

Where the photopolymer mixture is fluid or liquid it can be used to slush mold in a female mold, exposed to actinic radiation from the under side to form a skin by gelling the mixture. The excess photopolymer mixture is dumped, the skin is exposed to actinic light to cure the skin before the skin is stripped from the mold. In this case the mold is able to pass actinic light.

While certain representative embodiments and details have been shown for the purpose of illustrating the invention, it will be apparent to those skilled in this art that various changes and modifications may be made therein without departing from the scope of the invention.

What is claimed is:

1. A shaped skin for decorative parts having on at least one side thereof a high definition design and composed of a photocured polymer and a photocurable monomer and a nonphotocurable filler to adjust the elongation to values of 300 to 700%, a tensile $MN/M^2$ of 2 to 14 and a Shore A of 30 to 90.

2. The shaped skin of claim 1, wherein the photocured polymer is a polyurethane.

3. The shaped skin of claim 1, wherein the filler is a vinyl polymer.

4. The shaped skin of claim 1, wherein the photocurable monomer is an acrylic selected from the group consisting of alkyl esters of acrylic or methacrylic acids, or acrylic or methacrylic acid esters of a polyether glycol of about 50 to 3500 molecular weight.

5. The shaped skin of claim 1 having a cavity to receive a foam and the high definition design be on a side opposite said cavity.

6. The shaped skin of claim 1 wherein the high definition design exhibits a sewn or stitched pattern.

7. The shaped skin of claim 1 wherein the high definition design exhibits a grained pattern.

8. The shaped skin of claim 1 having a shape to receive a cushion protective item.

9. The shaped skin of claim 1 wherein the filler is a polymer.

* * * * *